Dec. 20, 1932.   H. LIEBIG   1,891,390
VENTILATOR FOR MOTOR CARS
Filed Dec. 15, 1930
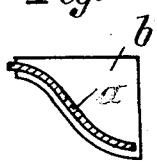
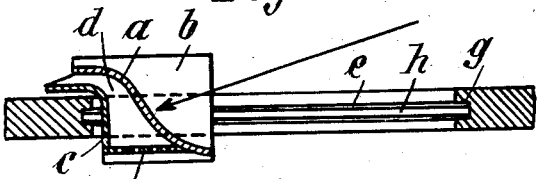
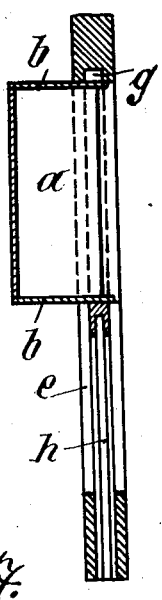
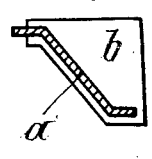
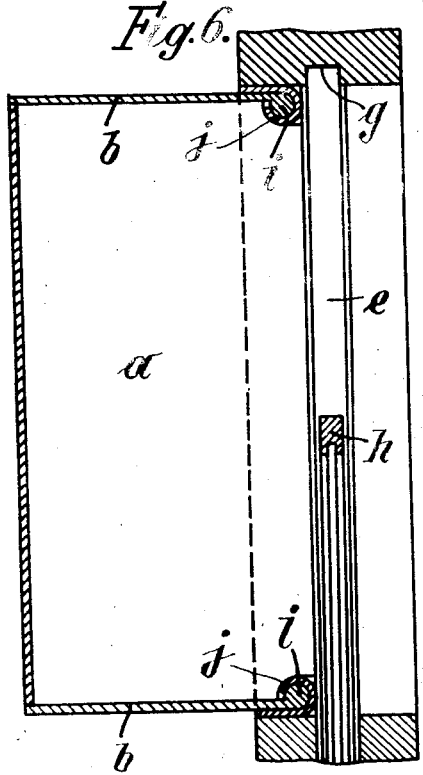
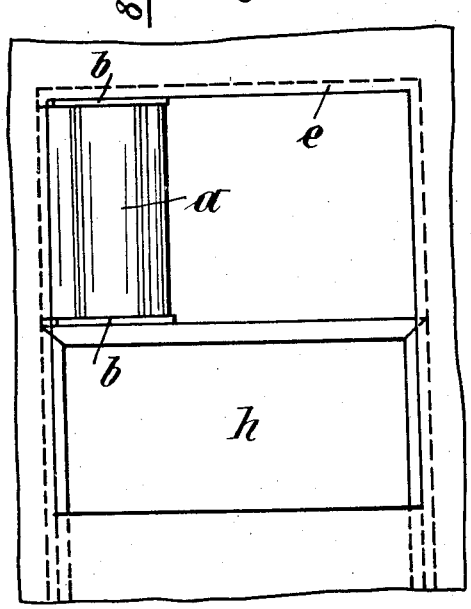
Inventor:
Heinrich Liebig Patented Dec. 20, 1932

1,891,390

UNITED STATES PATENT OFFICE

HEINRICH LIEBIG, OF NORDHAUSEN/HARZ, GERMANY

VENTILATOR FOR MOTOR CARS

Application filed December 15, 1930, Serial No. 502,492, and in Germany December 16, 1929.

This invention relates to a ventilator for letting off foul air, smoke, exhaust gases from closed spaces in motor cars, railway cars or airplanes, without formation of draught. The ventilator is placed vertically and removably in the open window, so that the largest portion of the width of the window remains open. The ventilator consists of a guide plate having a cover plate at the top and bottom and standing obliquely to the window, so that it acts similar to a wind screen against which the wind strikes and is deflected so that it cannot penetrate into the interior of the car but exerts a suction effect sucking the foul air from the car.

Several embodiments of the invention are illustrated by way of example in the accompanying drawing in which:

Fig. 1 shows in cross section a ventilator consisting of a curved plate.

Fig. 2 shows in cross section a ventilator consisting of an inclined plate.

Fig. 3 shows in cross section a box-shaped ventilator.

Fig. 4 shows the ventilator Fig. 1 inserted in a window.

Fig. 5 shows in cross section a ventilator mounted behind a window.

Fig. 6 is a section on line 6—6 of Fig. 5 on enlarged scale.

Fig. 7 shows in elevation viewed from the inner side a ventilator mounted above a window.

Fig. 8 is a section on line 8—8 of Fig. 7.

The ventilator shown in Figs. 1, 2 and 4 consists of an oblique straight or curved plate $a$ and covered at the top and bottom by a cover plate $b$ designed to prevent the air flowing along the plate $a$ from entering into the space to be ventilated.

For guiding the air current a second plate $c$ may be arranged at a short distance from plate $a$ (Fig. 3) so that by these two plates a ventilation channel $d$ is formed. An inner end wall $f$ of the ventilator is perforated by holes adapted to be adjusted as regards open area by a slidable plate or other device not shown.

Figs. 3, 4 and 5 show that the ventilator inserted in the window frame is oblique to the direction of the wind, so that the wind blows against the guide plate $a$ and is deflected by this plate in outward direction.

When using the ventilator consisting of one single guide plate $a$, the outer end of this guide plate can be inserted into the groove $g$ in the window frame designed to guide the window $h$ (Fig. 4) so that the ventilator rests upon the top edge of the window $h$ as shown in Fig. 8 and is securely held by this window.

The ventilator may, however, be arranged in the window frame in such a manner that the window can be opened or closed without hindrance by the ventilator. With this object in view the inner edge $i$ of each cover plate $b$, $b$ is bead shaped adapted to be inserted from the side each into an according hollow bar $j$ fixed at the top end and at the bottom end of the window frame in front of the window $h$ (Fig. 6). In this case the window can be opened as wide as desired.

The guide plate must be of according length when the windows are particularly wide.

The ventilator is designed not only for motor cars, railway compartments, cabins in airplanes, but also for vehicle roofs, attic- and top-room windows, walls and ceilings, fan-lights, windows adjustable in horizontal direction and the like.

The ventilator is preferably made of transparent material in order not to obstruct the outlook.

I claim:—

1. A ventilator for motor cars and other vehicles, comprising in combination a straight guide plate adapted to be inserted in the open window on the opposite side to the direction of travel and filling about one third of the window width its front edge projecting into the interior of the vehicle and its rear edge projecting from the vehicle, and two vertical cover plates one on the top and the other on the bottom of said guide plate.

2. A ventilator for motor cars and other vehicles, comprising in combination a straight guide plate adapted to be inserted in the open window on the opposite side to the direction of travel and filling about one third of the window width its front edge projecting into the interior of the vehicle and its rear edge projecting from the vehicle, two vertical cover plates one on the top and the other on the bottom of said guide plate, longitudinal beads on said cover plates, and guides fitted on the window frame behind the window adapted to accommodate said longitudinal beads.

In testimony whereof I affix my signature.

HEINRICH LIEBIG.